(12) United States Patent
Sung et al.

(10) Patent No.: US 8,023,979 B2
(45) Date of Patent: Sep. 20, 2011

(54) METHOD AND SYSTEM FOR SPLITTING TERMINALS IN PUSH-TO-TALK OVER CELLULAR NETWORK

(75) Inventors: Sang-Kyung Sung, Suwon-si (KR); Joon-Goo Park, Yongin-si (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 1413 days.

(21) Appl. No.: 11/372,255

(22) Filed: Mar. 9, 2006

(65) Prior Publication Data

US 2006/0234744 A1      Oct. 19, 2006

(30) Foreign Application Priority Data

Mar. 9, 2005   (KR) .......................... 10-2005-0019781

(51) Int. Cl.
*H04W 4/00*       (2009.01)

(52) U.S. Cl. ........ 455/518; 709/227; 370/338; 370/401; 370/522

(58) Field of Classification Search ............... 455/414.1, 455/518; 450/518; 370/338, 401, 522; 709/227
See application file for complete search history.

(56) References Cited

U.S. PATENT DOCUMENTS

| | | | |
|---|---|---|---|
| 2003/0023730 A1* | 1/2003 | Wengrovitz et al. | 709/227 |
| 2004/0139198 A1* | 7/2004 | Costa-Requena et al. | 709/227 |
| 2004/0190489 A1* | 9/2004 | Palaez et al. | 370/351 |
| 2004/0249949 A1 | 12/2004 | Gourraud et al. | |
| 2005/0124365 A1* | 6/2005 | Balasuriya et al. | 455/518 |
| 2005/0232241 A1 | 10/2005 | Wu et al. | |
| 2006/0046757 A1* | 3/2006 | Hoover et al. | 455/518 |

FOREIGN PATENT DOCUMENTS

| | | |
|---|---|---|
| JP | 9-186768 | 7/1997 |
| JP | 2001-177665 | 6/2001 |
| JP | 3388977 | 3/2003 |
| JP | 2004-537900 | 12/2004 |
| JP | 2005-020080 | 1/2005 |
| WO | WO 03/012669 | 2/2003 |
| WO | WO 03/034196 | 4/2003 |
| WO | WO 2004/015932 | 2/2004 |

* cited by examiner

*Primary Examiner* — Pierre-Louis Desir
(74) *Attorney, Agent, or Firm* — The Farrell Law Firm, P.C.

(57) ABSTRACT

A method establishes a PoC multimedia session for making a PoC multimedia call according to a support attribute of a PoC terminal and sets media for each session. In the method, a message for setting a session management server to split arbitrary PoC user terminals according to an attribute of media to establish the session is transmitted from the arbitrary PoC user terminals to the session management server. An INVITE message according to the media attribute is transmitted from the session management server to each of the terminals based on the setting.

22 Claims, 8 Drawing Sheets

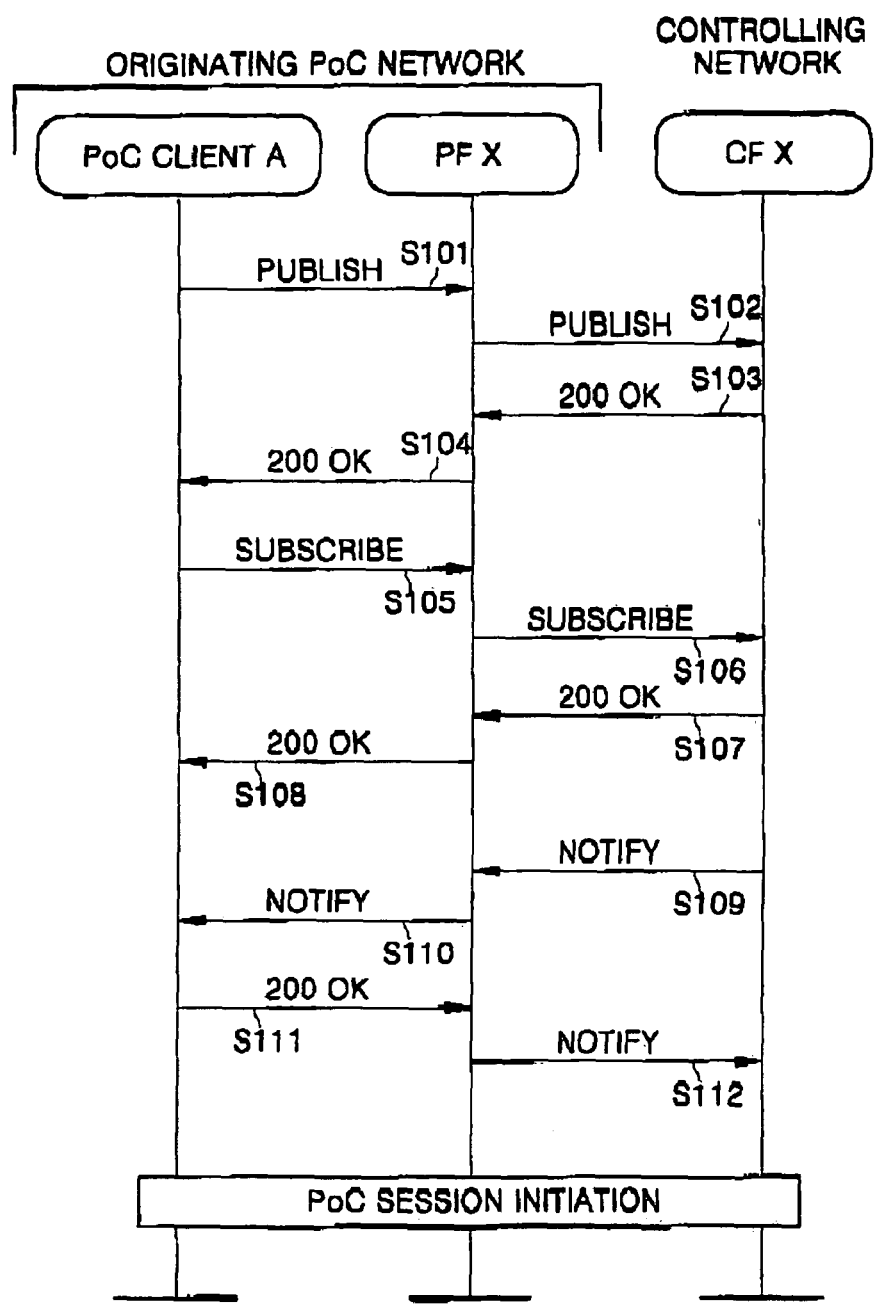

FIG. 5

```
PUBLISH <sip:poc_server@example.domain.com>
From: <sip:client_a@domain.com>;tag=49583
To: <sip:poc_server@example.domain.com>
Call-ID: asd88asd77a@client_apc.domain.com
CSeq: 1 PUBLISH
Max-Forwards: 70
Accept-Contact: *;+g.poc.talkburst;require;explicit
Event: poc-settings
Content-Type: application/poc-settings+xml
Content-Length: <appropriate value>

<?xml version="1.0" encoding="UTF-8"?>
<poc-settings
    xmlns="urn:oma:params:xml:ns:poc:poc-settings"
    xmlns:xsi="http://www.w3.org/2001/XMLSchema-instance"
    xsi:schemaLocation="urn:oma:params:xml:ns:poc:poc-settings">

<note>Session splitting due to media type</note>
    <display-name>Media splitting</display-name>
    <media type="audio">
        <target-uri>sip:client_a@domain.com</target-uri>
    </media>
    <media type="video">
        <target-uri>sip:client_a1@domain.com</target-uri>
    </media>
    <media type="text">
        <target-uri>sip:client_a2@domain.com</target-uri>
    </media>
</poc-settings>
```

FIG. 7

```
INVITE sip:client_a@example.domain.com SIP/2.0
Via: SIP/2.0/UDP poc_server_a.domain.com;
Via: SIP/2.0/UDP poc_server_x.domain.com;
Via: SIP/2.0/UDP poc_server_b.domain.com;
Via: SIP/2.0/UDP client_bpc.domain.com;branch=z9hG4bK776sgdkse
From: <sip:client_b@domain_b.com>;tag=49583
To: <sip:client_a@example.domain.com>
Call-ID: asd88asd77a@client_bpc.domain.com
CSeq: 5 INVITE
Max-Forwards: 70
Accept-Contact: *;+g.poc.talkburst;require;explicit
Content-Type: multipart/mixed
Content-Length: <value?>

<Content-Type: multipart/mixed>
c=IN IP6 5555::aaa:bbb:ccc:ddd
m=audio 3456 RTP/AVP 97
a=rtpmap:97 AMR
a=rtcp:5560
m=application 2000 udp TBCP
a=fmtp:TBCP queuing=1; tb_priority=2

--------Boundary1
<XML MIME Body>
-
</XML MIME Body>
```

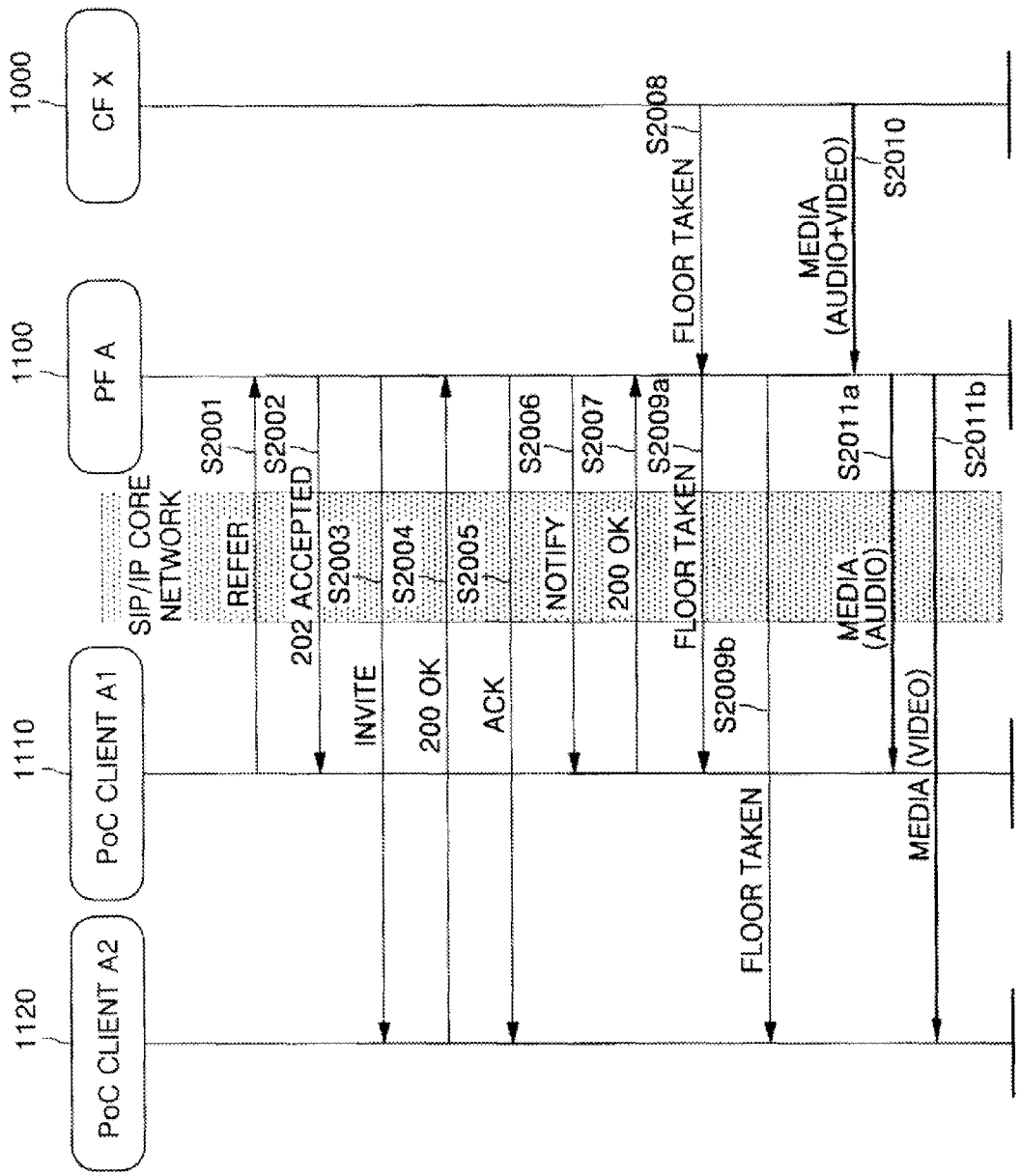

METHOD AND SYSTEM FOR SPLITTING TERMINALS IN PUSH-TO-TALK OVER CELLULAR NETWORK

PRIORITY

This application claims the benefit under 35 U.S.C. §119 (a) from an application entitled "METHOD AND SYSTEM FOR SPLITTING TERMINALS IN PUSH-TO-TALK OVER CELLULAR NETWORK" filed in the Korean Intellectual Property Office on Mar. 9, 2005 and assigned Serial No. 2005-19781, the contents of which are incorporated herein by reference.

BACKGROUND OF THE INVENTION

1. Field of the Invention

The present invention relates to technology for splitting multimedia type-specific terminals of a push-to-talk-over-cellular (PoC) system to transmit media.

2. Description of the Related Art

Significant developments in mobile communications technology and the extension of mobile communications networks have resulted in the development of a vast array of services and applications for use with a cellular phone. At the same time, demand among cellular phone users for these additional services, such as a location service, a multimedia service, and a push-to-talk (PTT) service, is increasing. The PTT service supports various supplementary functions such as an instant messenger function and a status display function, as well as a group call and a voice call which are also provided by an existing radio or a trunk radio system (TRS).

Currently, standardization of a push-to-talk-over-cellular (PoC) service that employs the PTT function in a mobile communication network is taking place. A unique feature of the PoC service is that a user can participate in a plurality of PoC sessions and can also use a call service while switching from the PoC sessions as desired. This feature is a requirement that is specified in the open mobile alliance (OMA), which is a forum for specifying mobile communications services.

FIG. 1 is a schematic diagram of a conventional PoC service system. Referring to FIG. 1, a PoC client 10, as a service requester installed in a mobile station, is generally connected to a Session Initiation Protocol/Internet Protocol (SIP/EP) core network 30 that supports SIP and IP multimedia functions via an access network 20.

The PoC client 10 resides in a PoC user terminal to provide access to the PoC service. The PoC client 10 mainly serves to establish, participate in and terminate a PoC session. In addition, the PoC client 10 makes and transfers a talk burst, supports an instant personal alert and performs authentication when accessing the PoC service. Hereinafter, unless otherwise stated, the PoC client 10 is assumed to be the same as a PoC service subscriber or PoC terminal.

The SIP/EP core network 30 is connected to a PoC server 60, a GLMS (Group List and Management System) 50, and a presence server 70 in order to support the PoC service.

Generally, SIP is a standard defined in the IETF (Internet Engineering Task Force) RFC (Request for Comments) 2543. SIP is an application-layer control protocol that is used to set up, modify and terminate a session or call for multimedia communication such as video and voice communication. SIP exists over a UDP (User Datagram Protocol)/TCP/IP layer, which supports both unicast and multicast sessions for initiating a session by inviting participants to a multimedia conference with a client/server protocol capable of exchanging SIP Request and Response messages in a request/response fashion.

The SIP Request message provides six functions in RFC 2543 as follows: INVITE (Invitation to participate in a session), ACK (Acceptance of an INVITE request), BYE (Termination of a call), REGISTER (Registration with a redirect server by a user agent), CANCEL (Cancellation of a pending request), and OPTIONS. The SIP Response message provides status codes as follows: 1xx (Information response), 2xx (Success response), 3xx (Redirection response), 4xx (Client Error, Request Failure), 5xx (Server Error), and 6xx (Global Failure).

The PoC server performs a Controlling PoC Function (CF) of controlling overall maintenance and management of a PoC session and a Participating PoC Function (PF) of controlling maintenance and management between each PoC session, which will be explained below with reference to Tables 1 and 2.

TABLE 1

Controlling PoC Function (CF)

Provides centralized PoC session handling
Provides centralized Media distribution
Provides centralized Talk Burst Arbitration functionality including talker identification
Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As shown in Table 1, the CF serves to maintain and manage a PoC session. The PoC server receives requests for the floor from PoC clients, arranges an order in which to give the clients the floor, and gives the clients the floor in that order. The PoC server also distributes a talk burst, for which an arbitrary PoC client makes a request, to all other PoC clients participating in a group PoC call, and provides information of the PoC clients participating in the group PoC call.

As shown in Table 2 below, the PF manages a PoC session between the CF and each PoC client. Particularly, the PF relays the floor between the PoC client and the CF when the PoC client makes a request for the floor or when the CF gives the floor to the PoC client. In addition, the PF relays media between the CF and the PoC client, performs transcoding between different codecs, and filters one of two concurrent PoC sessions according to the choice of a PoC user when there is simultaneous talking in the two active PoC sessions.

TABLE 2

Participating PoC Function (PF)

Provides PoC session handling
May provide the Media relay function between PoC client and Controlling PoC server
May provide user media adaptation procedures
May provide the Talk Burst control message relay function between PoC client and Controlling PoC server
Provides SIP session handling, such as SIP session origination, termination, etc, on behalf of the represented PoC client.
Provides policy enforcement for incoming PoC session (e.g. access control, incoming PoC session barring, availability status, etc.)
May collect and provide media quality information TABLE 2-continued Participating PoC Function (PF)

Provides participant charging reports
May provide filtering of media streams in the case of simultaneous sessions
May provide transcoding between different codecs
May support Talk Burst Control Protocol Negotiation
Stores the current Answer Mode and Incoming PoC Session Barring preferences of the PoC client In the PoC service system described above, the PoC user can input information on a group and its members to the GLMS 50 through his/her PoC terminal, and can receive information about PoC users whom he or she can call through an individual or group list transmitted from the GLMS 50. Alternatively, the information on the group and its members may be input, modified and managed in the GLMS 50 via a reliable communication network such as the Internet or an Intranet.

In order to use the PoC call service, the PoC user registers his/her PoC address with the SIP/IP core network 30. The SIP/IP core network 30 stores PoC user information at the request of the PoC user. Thus, when another PoC user tries to request a group PoC call, the PoC user registers his/her information in the SIP/IP core network 30 in advance, and requests the group PoC call to his/her SIP/IP core network by using group identification information transmitted from the GLMS 50. At this time, the SIP/IP core network 30 performs address determination and domain location determination by using information of the call requesting PoC user and then transfers a PoC call request to a home PoC server with which the call requesting PoC user is registered. In regard to the PoC call request, the PoC server prepares to establish a PoC session, obtains each user's information from the GLMS, and then transfers a PoC call request signal to a corresponding SIP/IP core network. When a PoC call request is made to users within an Intradomain, the PoC server performs both the CF and PF. The PoC server, which manages a call-requested PoC user, requests a PoC call to the PoC user after the SIP/IP core network performs the locating procedure, by using information of the PoC user that is transmitted to the PoC server.

Features of the PoC system in the OMA are as follows.

The PoC system is divided into an on-demand session mode and a pre-established (or early) session mode, according to the connection with a PoC server within a user's home network.

The pre-established session mode is designed so that the PoC user sets up a session between a PoC client and a PoC server belonging to a PoC user's home network in advance by PoC user's request. The pre-established session enables the PoC user to negotiate media parameters to be used with the PoC server in advance, and thus perform rapid call setup without renegotiating the media parameters to be used in the future between the PoC server and client. In order to set up the pre-established session, the PoC client provides supported media parameters to a Session Description Protocol Multi-purpose Internet Mail Extensions (SDP MIME) body through a method of SIP INVITE, and responds to the media parameters provided from the PoC server. The PoC client sends, to the PoC user, identification information of the pre-established session for a response message received from the PoC server, together with a conference Uniform Resource Identifier (URI). When using the pre-established session, it is possible to pre-negotiate such parameters as an IP address, a port number, a codec to be used and a talk burst control protocol.

The on-demand session mode refers to a state in which the PoC user does not set up the pre-established session, and indicates that the PoC user performs a PoC call connecting procedure after receiving an INVITE message of another PoC user.

Meanwhile, the PoC system enables the PoC to make a half-duplex group call in addition to the foregoing features. This multilateral conferencing function is a representative feature of the PoC, and is divided into an ad-hoc PoC group, a pre-arranged PoC group and a chat PoC group according to how it is set up.

In the PoC system having the foregoing features, respective elements such as the PoC client, PoC server, SIP/IP core network, group list server and presence server, as well as procedures of initiating and connecting an initial PoC session through signaling between these elements can be found from the OMA standard draft as the conventional SIP-based technology. Thus, their description will be omitted herein.

A procedure for establishing a PoC multimedia session in the PoC system will be described below. The procedures for session establishment with respect to each PoC group are similar. The same procedure is repeated for all members in order to establish the group session. Hence, the procedure for establishing the PoC multimedia session will be described on the basis of a procedure for establishing the session for one PoC member. To this end, the procedure for establishing the PoC multimedia session will be described with reference to FIGS. 2 and 3. In FIGS. 2 and 3, an originating side requester for a PoC call makes a request for call processing by sending a multimedia invitation message using a SIP protocol (herein, the case of requesting audio and video calls is considered by example). On a terminating side, an auto answer mode is set up, and a pre-established session exists. Under these conditions, call processing procedures of call originating and terminating sides implemented by the prior art are each described.

FIG. 2 shows a signaling flow for a conventional process of connecting the PoC multimedia session of an originating side.

Referring to FIG. 2, a PoC client A sends an INVITE message, which includes the SIP address of a receiver to whom the PoC client A desires to talk, to an SIP/IP core A (S11). At this time, the INVITE message includes elements such as information on the PoC address of a call request client, requested media parameters (since the requested session is based on the multimedia, which has various media attribute values such as an encoding method referring to audio and video, a rate, and a payload type), and information on an attribute value informing PoC service, etc. The INVITE message is transmitted to a PoC server (hereinafter PF A), which controls a participating function via corresponding servers (Proxy Call Session Control Function (P-CSCF) and Serving Call Session Control Function (S-CSCF)) in an IMS network through a route query at a Dynamic Host Configuration Protocol (DHCP) server or DNS server (S12). Since the PF A, to which a PoC user is connected when a general call request is made, can be split from a PoC server X (hereinafter CF X) that manages the talk burst of an established session, the INVITE message forwarded through steps S11 and S12 is transmitted to the CF X via an SIP/IP core network of each network (S13, S14 and S15).

A controlling network including the CF transmits the INVITE request forwarded through step S15 to the corresponding SIP/IP core network, and then receives a response message. An SIP message with which the terminating side network responds may be one of provisional response messages of 1XX, successful response messages of 2XX, and error response messages of 4XX, 5XX and 6XX (herein, the description will be oriented to a normal call processing procedure within a range that does not deviate from the fundamental effect of the present invention). After step S15, the CF can receive an AUTO-ANSWER or OK response according to an answering mode of the terminating side. Alternatively, in the case of the AUTO-ANSWER response of FIG. 2, the CF may receive a signal SIP 183 Session Progress, and thus perform connection between the PoC server and client in the IMS network of the call requester. A call acceptance signal of the receiver is sent as the SIP 183 Session Process or SIP 200 OK response, and forwarded to the PoC client A via the PoC servers of the CF and PF (S16 through S20).

Meanwhile, after receiving the 200 OK or 183 Session Progress response from the PoC server of the terminating side, the CF determines whether a PoC call is connected or not, and then sends a Floor Granted signal that grants the talk burst floor to the PoC client A. Granting the talk burst authority according to the response (200 OK or 183 Session Progress) may be divided into confirmed and unconfirmed types, which explains why the CF requires a buffering function.

After receiving the acknowledgement response signal to the INVITE request signal (S16 through S20), the PoC client A receives the Floor Granted signal in order to forward a talk burst transmission enable signal (ring back tone) using an Real-time Transport Control Protocol(RTCP) protocol (S21 and S22). At this time, the Floor Granted signal is generated from the CF having the authority to arbitrate the talk burst, and transmitted to a corresponding PoC client via the PF, which manages the corresponding PoC client. The Floor Granted signal may be transmitted without passing through the SIP/IP core network since it uses a bearer's route instead of an SIP protocol. The PoC user, who finally confirms the ring back tone, transmits a media stream (e.g. voice) using an Real-time transport protocol (RTP) protocol.

FIG. 3 shows a conventional call processing procedure of the terminating side based on the assumption of successful session establishment when a pre-established session is set up between a server and client of the terminating side in correspondence to the aforementioned call processing procedure of the originating side.

It is assumed that media attribute values between a PoC server and a PoC client that set up a pre-established session make use of designated attribute values with no change when a new session is requested.

An INVITE message received from an originating side network is transmitted to a PoC server belonging to the home network of a terminating PoC client through an SIP/IP core network according to the call processing procedure of an IMS network (S31, S32 and S33). At this time, a PF B sets a setup value of its answering mode in an auto answer mode, and thus transmits an SIP 200 OK message to the originating side network in response to the INVITE request message (S34, S35 and S36). The PF B does not transmit the INVITE message to the PoC client that is connected therewith because it is unnecessary to change the pre-established session.

Meanwhile, the PoC server, CF X, of a controlling network which receives an OK response returned through an IMS route transmits the OK response to the originating PoC client, and thereby completes the PoC call processing procedure (S37), and transmits a Floor Granted signal that grants the talk burst floor, to the originating PoC client (S38). Further, the CF transmits an RTCP signal of granting the floor, and simultaneously transmits a Receiving Talk Burst signal, that includes a PoC address or display name of the PoC user having the floor, to a terminating PoC user (S39 and S40). Thereby, the CF enables a terminating PoC client to receive beforehand sender's information of a media stream to be transmitted in the future. This talk burst transmission signal can be transmitted without passing through the SIP/IP core network because it uses a bearer's route instead of an SIP. Meanwhile, the media (voice) stream that is ultimately sent from the originating side is transmitted to a PoC client B through the bearer's route using an RTP, and thereby the PoC call is initiated.

According to the prior art, the following are technical problems that negatively affect the user.

First, the originating PoC client repeatedly transmits the INVITE message in order to establish the PoC multimedia session.

Second, the originating PoC client separates and transmits audio and video through two independent sessions, each of which has been established. Thus, additional support making it possible to be subject to the same floor control is required. However, the conventional PoC system does not support this function, the creating a need for a technical solution to this problem.

Fourth, in the originating PoC client's position, since the INVITE message is repeatedly transmitted in order to separate the media and then establish the session, a long time is required to obtain the floor.

SUMMARY OF THE INVENTION

It is an object of the present invention to provide a method and system for setting a PoC compatible terminal according to a type of media of a multimedia session by selecting the PoC terminal or PoC compatible terminal suitable for each attribute of the media with respect to a multimedia PoC call used together with audio, video etc. by request of a user, and designating the attribute of the corresponding media when a call is requested using the selection.

Another object of the present invention is directed to using an SIP, an application layer protocol, for controlling a PoC call and its expanded protocol with respect to a process for exchanging multimedia sessions.

According to the present invention, there is provided a method for establishing a session in a push-to-talk-over-cellular (PoC) network, including transmitting a message, for setting a session management server so as to split arbitrary PoC user terminals according to an attribute of media to establish the session, from the arbitrary PoC user terminals to the session management server, and transmitting an INVITE message according to the media attribute from the session management server to each of the terminals based on the setting.

According to the present invention, there is provided a method for splitting terminals according to an attribute of media of a push-to-talk-over-cellular (PoC) network to transmit the media, including transmitting a message, including information for receiving a part of the media from an arbitrary PoC user terminal which is receiving the media through another terminal, to a session management server, and transmitting an INVITE message to the terminals to receive the media that is newly split and transmitted at the session management server.

According to the present invention, there is provided a system for splitting terminals according to an attribute of media of a push-to-talk-over-cellular (PoC) network to establish a session, including a terminal split-off requesting PoC client for requesting to split terminating side terminals according to the media attribute to transmit the media, at least one terminating PoC client for providing a function corresponding to the media attribute and receiving the split, transmitted media, and a session management server for receiving a terminal split-off request message from the terminal split-off requesting PoC client, and transmitting an INVITE message for transmitting the media matched to a value of the media attribute to each terminal with reference to the media attribute value included in the terminal split-off request message.

According to the present invention, there is provided a system for splitting terminals according to an attribute of media of a push-to-talk-over-cellular (PoC) network to transmit the media, including a terminal split-off requesting PoC client for receiving the media and transmitting a message including information for receiving a part of the received media, at least one terminating PoC client for providing a function corresponding to the media attribute and receiving the split, transmitted media, and a session management server for receiving a message including information for receiving the part of the media from the terminal split-off requesting PoC client through another terminal, and transmitting an INVITE message for receiving the media that is newly split and transmitted.

According to the present invention, there is provided a terminal for splitting terminals according to an attribute of media of a push-to-talk-over-cellular (PoC) network to establish a session, including setting information used for splitting the terminals according to the media attribute for the session management server to which the terminal belongs, in order to split the terminating side terminals according to the media attribute to receive the media.

According to the present invention, there is provided a session management server for splitting terminals according to an attribute of media of a push-to-talk-over-cellular (PoC) network to establish a session, including storing information used for splitting the terminal according to the media attribute in order to split terminating side terminals according to the media attribute to transmit the media, extracting a type of the media included in the INVITE message transmitted from originating PoC clients, and comparing the extracted information with information on the media set for each terminal, combining routing information, splitting the received INVITE messages for the multimedia session to each corresponding media-specific routing address, and transmitting the split INVITE messages to each terminal.

According to the present invention, there is provided a terminal for splitting terminals according to an attribute of media of a push-to-talk-over-cellular (PoC) network to transmit the media, including, in order to split the terminating side terminals according to the media attribute to receive the media, receiving the media, and transmitting a message including information for receiving a part of the received media.

According to the present invention, there is provided a session management server for splitting terminals according to an attribute of media of a push-to-talk-over-cellular (PoC) network to transmit the media, including, in order to split the terminating side terminals according to the media attribute to receive the media, receiving the media, receiving a message including information for receiving a part of the received media from an arbitrary PoC client terminal through another terminal, and transmitting an INVITE message to the terminal for receiving the media that is newly split and transmitted.

BRIEF DESCRIPTION OF THE DRAWINGS

The above and other objects, features and advantages of the present invention will be more clearly understood from the following detailed description, taken in conjunction with the accompanying drawings, in which:

FIG. 4 shows a signaling flow for a process of setting media attributes for a PoC server in order to split media-specific PoC compatible terminals for implementing the present invention;

FIG. 5 shows the format of a SIP PUBLISH message for setting media attributes of FIG. 4;

FIG. 7 shows the format of an INVITE message for PoC session setup when a media-based session split-off of FIG. 6 is set up; and FIG. 8 shows a signaling flow for a process of splitting PoC compatible terminals in consideration of media attributes in accordance with a second embodiment of the present invention.

DETAILED DESCRIPTION OF EXEMPLARY EMBODIMENTS

Figure 1:
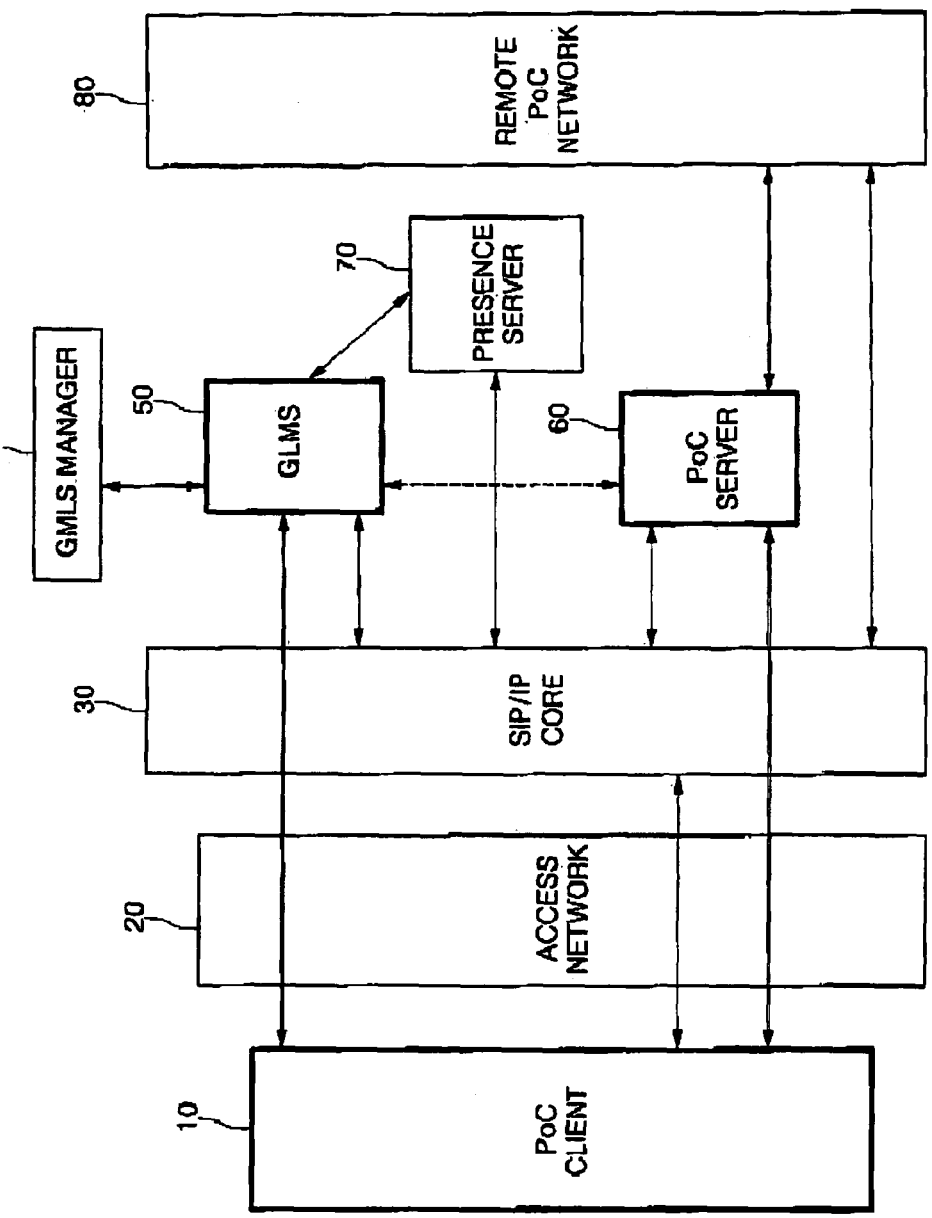
FIG. 1 is a schematic diagram of a conventional PoC service system.
Figure 2:
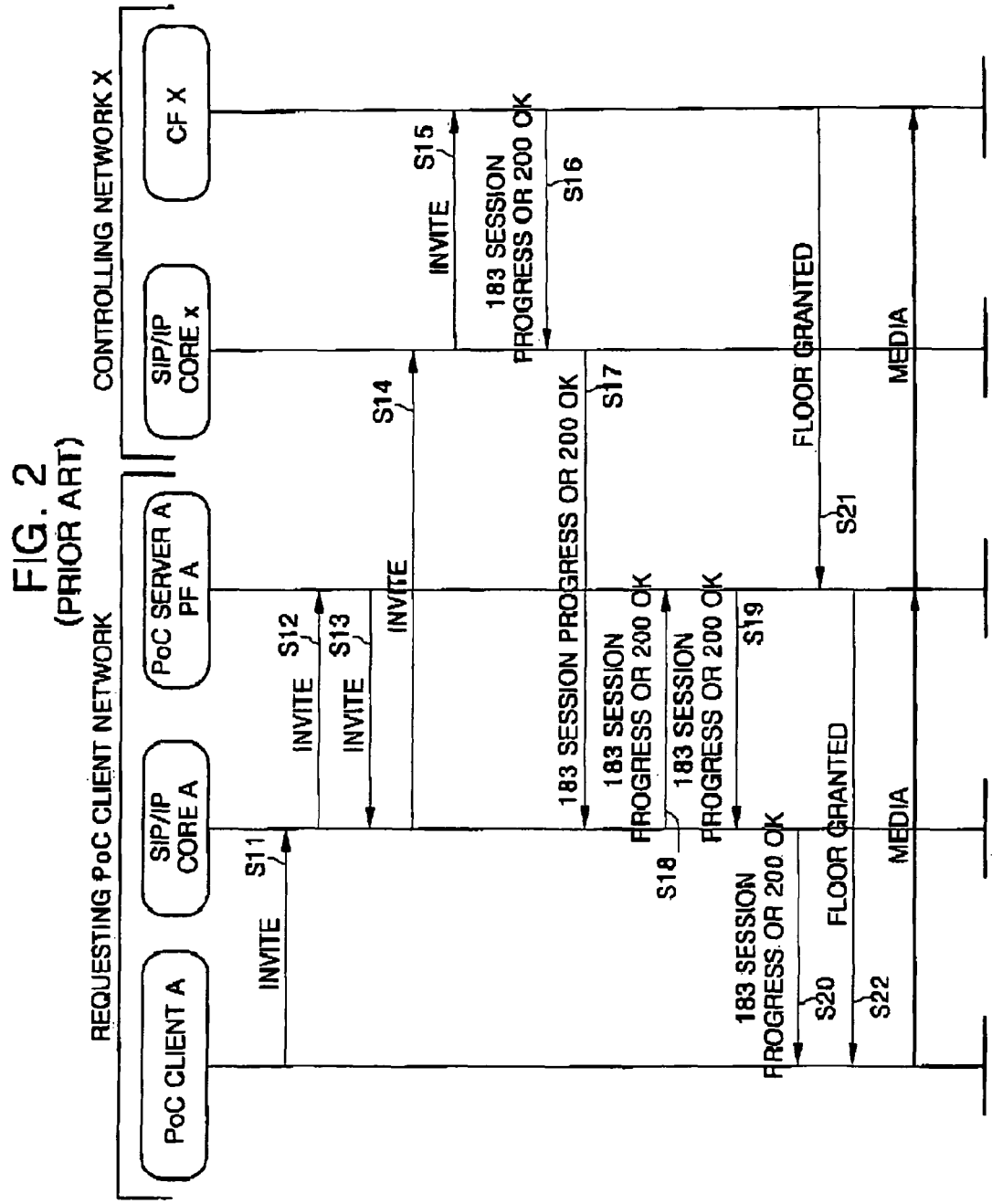
FIG. 2 shows a signaling flow for a conventional process of connecting the PoC multimedia session of an originating side.
Figure 3:
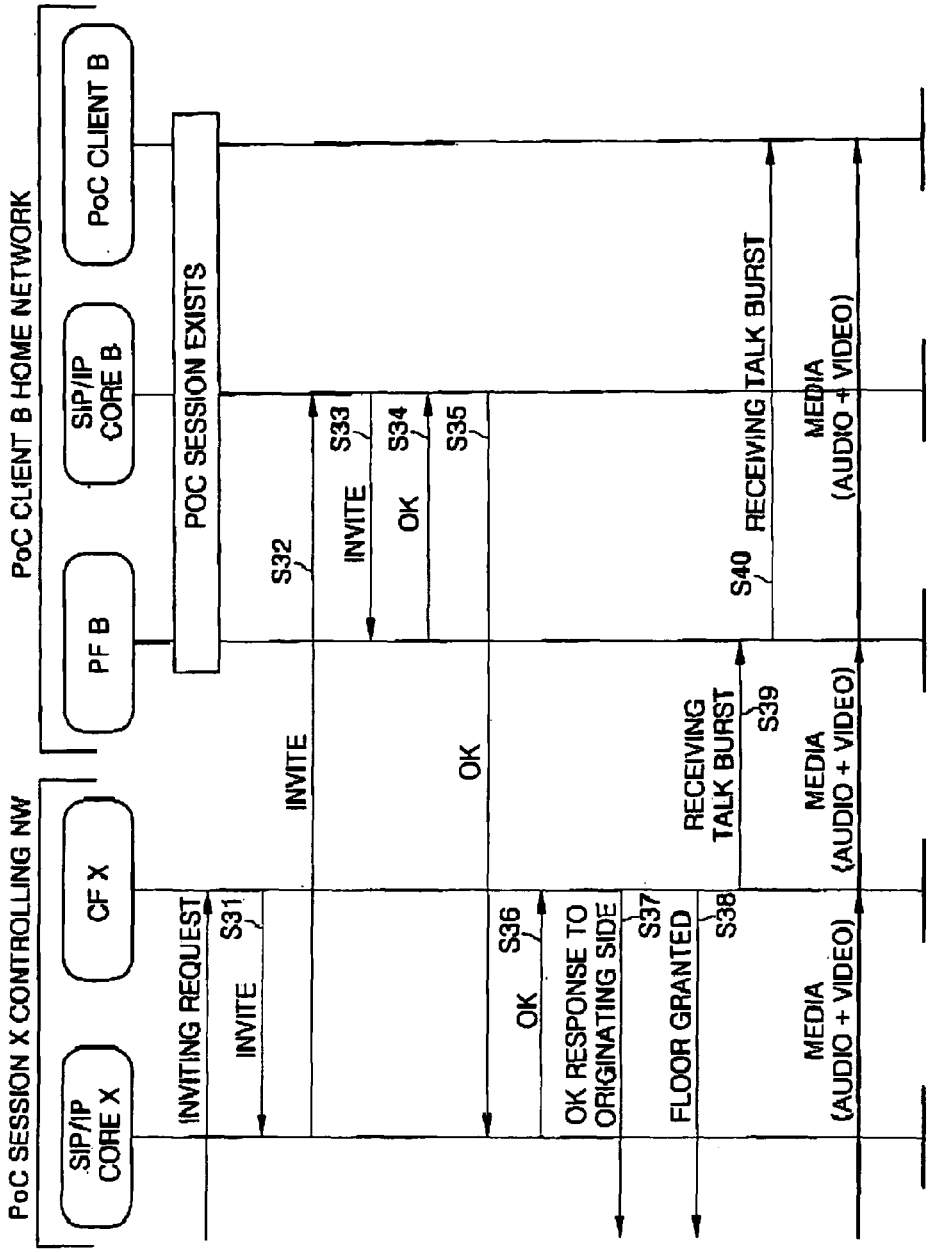
FIG. 3 shows a signaling flow for a conventional process of connecting the PoC media session of a terminating side.

Hereinafter, exemplary embodiments of the present invention will be described in full detail with reference to the accompanying drawings. In the following description, a detailed description of known functions and configurations incorporated herein has been omitted for the sake of clarity and conciseness.

The following description will be made regarding application services of a PoC system which makes it possible to make an immediate call according to a call request using a network based on an Internet Protocol (IP) Multimedia Core Network (CN) Subsystem (IMS) whose standardization has been completed in $3^{rd}$ Generation Partnership Project (3GPP) or 3GPP2, and information on a half-duplex call and a group of users.

The present invention has a construction based on at least one PoC client and PoC server (PF and CF) defined in the OMA PoC Release 1 system, an SIP and an expanded SIP. The basic construction is the same as an ordinary PoC basic structure, and thus are omitted herein.

FIG. 4 shows a method of pre-setting session establishment parameters, such as transmission expenses according to media, and modification of streaming quality for an effective PoC call, which a PoC client A requests.

When a request to establish a PoC multimedia session for the PoC client is transmitted after the process of FIG. 4 is performed, a procedure for splitting the clients on the basis of the media can be completed by using a process of FIG. 6, which will be described below.

First, the process of setting media attributes will be described in detail with reference to FIG. 4.

A PoC client wanting to make a PoC call performs PoC service settings, used when session establishment requested to the PoC client is performed, for a PoC server of its own home PoC network by using an SIP PUBLISH method. First, an SIP message forwarded by the SIP PUBLISH method includes an Event header. When the PoC multimedia session is requested through a field value included in the header, a PF can announce that the SIP message is set for a corresponding client so as to separate the session on the basis of the media.

The Event header field value can use a field value "poc-settings" defined in the conventional PoC Release 1, or can be defined as a new field value. Meanwhile, a type of each concrete content (a PoC terminal to transmit an INVITE request according to each media type when the multimedia session is established, information on its address, or information on capability of the client), which is transmitted to the PF through an SIP PUBLISH message, can be set through a Content-Type header of the SIP message. This Content-Type may be set to a text/plain value or application/xml value, details of which will be described below with reference to FIG. 5.

The process of FIG. 4 is based on the general SIP PUBLISH method. First, a PoC user sets information on the PoC terminal that he/she wants to use according to a media attribute. Next, the SIP PUBLISH message that includes the information and is generated from the PoC client is transmitted to a controlling PoC server through the route of an SIP/IP core network (S101 and S102).

At this time, the address of a corresponding PoC server (the SIP URI of a PF A) that the PoC client includes in the SIP PUBLISH message is used in a Request-URI. The SIP PUBLISH message is transmitted to the corresponding PoC server by routing a Serving Call Session Control Function (S-CSCF) of the SIP/IP core network using this address information. Meanwhile, when an ad-hoc PoC group call is made, or when the PoC session establishment for a single PoC client is requested, the PoC server for the PoC client A performs both the PF and the CF at the same time.

The PoC server, which receives the SIP PUBLISH message for the PoC session establishment from the PoC client, sends an SIP 200 OK response in return after confirmation of a version, PoC service information, and information on authentication/authorization (S103 and S104).

Meanwhile, the PoC client A can make a request for the SIP PUBLISH message to the PoC server in order to check the PoC settings which the PoC client A performs or determine whether an event such as session invitation occurs or not (S105 and S106), and receives an event response signal in the form of a 200 OK signal (S107 and S108).

With respect to the SUBSCRIBE request, the PoC server transmits an SIP NOTIFY message including content of the event in order to update the occurring event, and receives a 200 OK response in return (S109 and S112).

Finally, the PoC server receiving the SIP PUBLISH message begins to establish the PoC session based on the corresponding media when receiving the invitation to the multimedia session based on the Event header and contents.

FIG. 5 shows the format of an SIP PUBLISH message for setting media attributes of FIG. 4. Here, the message format and contents for PoC service settings of a PoC server using the SIP PUBLISH message are shown.

Referring to FIG. 5, the Event header of the SIP PUBLISH message indicates split-off of the PoC terminals for the multimedia session using the field value "poc-settings" defined in the conventional PoC system, but a new field value such as a separate value "session-split" may be defined for the present invention.

Meanwhile, the SIP PUBLISH message inserts concrete information on the terminal split-off into a body part on the basis of the definition of the header field value after the Event header is included.

To this end, the present invention transmits the information on the media-specific terminal split-off using an XML-based document of FIG. 5.

At this time, a content type used in FIG. 5 can be designated as Content-Type: application/vns.poc.nw_initiate+xml, which is used for an answering mode, an individual alerting signal and a session invitation interruption in the conventional system. However, when the new Event header field value is defined, the content type may be newly defined as Content-Type: application/vns.poc.session_split+xml.

After the designation of the content type, media-specific session split-off information set for the PF is stored in the body of the SIP PUBLISH message in the form of a media type, thus including at least media type-specific session connection information. In FIG. 5, the address information of a media type-specific target PoC terminal is designated as a field value "target-uri" in the parameter, and includes address information (e.g., SIP=URI) to be routed at the PF when actual media is transmitted.

At this time, the media type-specific session connection information of FIG. 5 can store session connection information of various media in addition to the media information included in the session invitation of the terminating side. If a request is made for one other than a set media type, an SIP Failure message is transmitted.

According to another method, the address information of the PoC terminal connected according to each media may use the same SIP URI. At this time, in order to distinguish different PoC terminals using the same SIP URI when the SIP message is routed at the PF, UA capability may be contained in the SIP PUBLISH message. Here, after receiving the content, the PF transmits the message with a corresponding capability contained in Accept-Contact, thereby performing the terminal split-off process.

According to yet another method, detailed terminal address information according to each media type may be transmitted using the header field value in the SIP PUBLISH method.

Further, event-triggering information may use a general text other than XML data.

Figure 6:
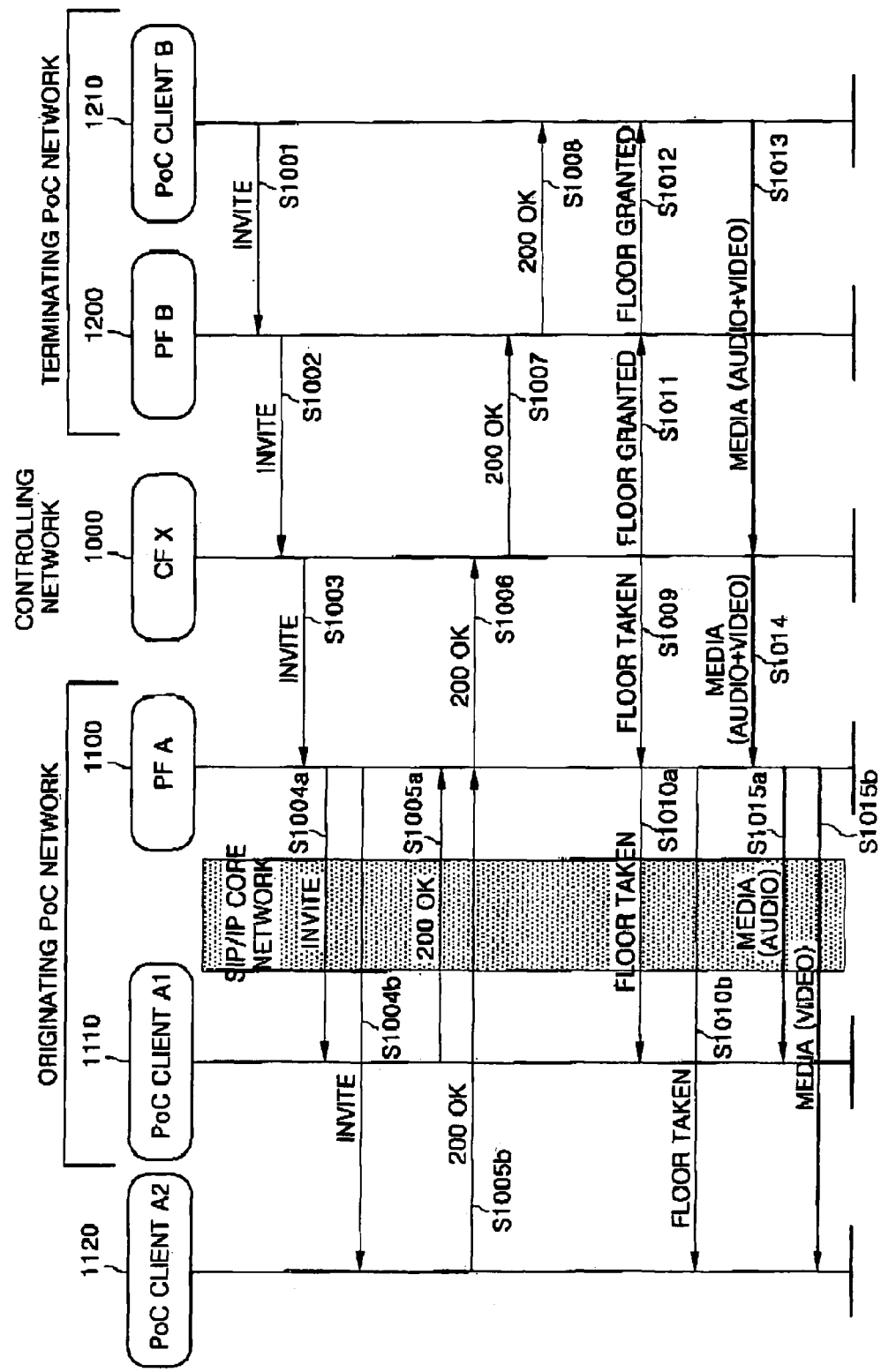
FIG. 6 shows a signaling flow for a process of splitting PoC compatible terminals in consideration of media attributes in accordance with a first embodiment of the present invention.

When the session split-off information based on the request of the user is set for the PF using the SIP PUBLISH message from the PoC client as shown in FIG. 4, and when a request signal for establishing the PoC multimedia session is received, the PF of the PoC server performs the following PoC session establishment process shown in FIG. 6.

FIG. 6 shows a signaling flow for a process of splitting PoC compatible terminals in consideration of media attributes in accordance with a first embodiment of the present invention.

Referring to FIG. 6, a PoC client B 1210 transmits an INVITE message including audio and video parameters to an originating PoC client in order to establish a multimedia session. At this time, the INVITE message has a Request URI, which is set as an SIP URI of a PoC client A1 1110. A media type offered to a Multipurpose Internet Mail Extensions (MIME) body part includes both "Audio" and "Video." The INVITE message is transmitted to a PF A 1100 via corresponding PF B 1200 and CF X 1000 through routing of an SIP/IP core network (S1001, S1002 and S1003).

Meanwhile, after confirming that the Request URI of the received INVITE message is the SIP URI of the PoC client A1 1110, the PF A 1100 applies PoC service settings that are set for the server for the purpose of media-specific terminal split-off. In order to apply the PoC service settings, the PF A 1100 extracts a requested media type from the received INVITE message, compares the extracted media type with media information set for the PF A, and combines routing information.

After this process, the PF A 1100 splits the received multimedia session INVITE message and transmits the split INVITE messages to corresponding routing addresses according to each media (S1004a and S1004b). The split-off of the session establishment request can be realized by applying a forking function of the SIP to the PoC server.

After receiving the PoC session establishment request, the PoC client A1 1110 and PoC client A2 1120 transmit a 200 OK response signal of each INVITE message in return (S1005a and S1005b). At this time, the PoC client A1 1110 waits for an OK response to be received from all the PoC terminals to which the INVITE message is transmitted, and after receiving a final response, transmits a 200 OK response through a routing path of the INVITE message in return (S1006, S1007 and S1008).

At this time, an SDP Answer included in the OK response is returned together with information on media parameters to which the corresponding PoC terminal responds according to each media, and the media parameters are fixed for use in the multimedia session through media parameter negotiation at the PoC server.

The PoC client B 1210 receiving the 200 OK response completes the session connection by transmitting an ACK signal. The media, finally transmitted by the PoC client B 1210 that is granted the floor, is sent to the PF A 1100 by way of the CF X 1000 (S1013 and S1014). At this time, the PF A 1100 splits the corresponding media according to the previously established session and transmit the split media to the corresponding PoC terminal (S1015a and S1015b), thereby implementing the PoC multimedia session split-off according to the media type.

In FIG. 6, the PoC client A1 1110, PoC terminal, receives the media for the audio, and the PoC client A2 1120 receives the media for the video. However, each of the terminals 1110 and 1120 is not limited to supporting only one media type, but can support various media types. The process of FIG. 6 illustrates the case where there are two originating PoC clients. However, it is apparent that the session split-off is made possible by the process of FIG. 6 in the case of at least one PoC client.

Further, the PoC client A1 1110 and PoC client A2 1120 illustrated in the present invention are merely for emphasizing that each client can set the media that each client wants to receive, based on the choice of the user regardless of the media support possibility of each client, split the set media based on their attribute values, and receive the split media.

FIG. 7 shows the format of an INVITE message for PoC session setup when a media-based session split-off of FIG. 6 is set up.

Referring to FIG. 7, the INVITE message in steps S1001 through S1003 of FIG. 6 is transmitted including the media parameter information of the audio and video for the multimedia session. Here, in the procedure of step S1004a of FIG. 6, the INVITE message having only the audio split through the forking process of the PF A 1100 is transmitted to the corresponding PoC client A1 1100. Thus, it can be seen that the Session Description Protocol (SDP) MIME portion transmits a media attribute value for the audio. Further, a floor control-related Talk Burst Control Protocol (TBCP) parameter included in the MIME portion is adapted to transmit the same value at the PF in step S1004a.

The media type-specific terminal split-off procedure of the present invention can be applied to the multimedia session when the multimedia session is established as well as while it is in progress. This method will be described with reference to a second embodiment.

FIG. 8 shows a signaling flow for a process of splitting PoC compatible terminals in consideration of media attributes in accordance with a second embodiment of the present invention.

In FIG. 8, a PoC client A1 1110 transmits a SIP REFER message to a PF A 1100 using dialogue information of a session which is used at present, and receives an Accepted response (S2001 and S2002). The SIP REFER message directly transmits information on an SIP address to newly transmit a part of the media using header and MIME portions of the SIP message. Thereby, the PF A 1100 transmits an INVITE message to an address requested by the SIP REFER message (S2003).

Meanwhile, after the session for a new terminal is successfully established (S2004 and S2005), the PF A 1100 notifies the requesting PoC client A1 1110 of the result (S2006) and receives a 200 OK response (S2007), thereby splitting media according to each terminal after a procedure of granting a floor (S2008, S2009a and S2009b) and then transmitting each stream S2010, S2011a and S2011b).

In FIG. 8, the PoC client A1 1110, i.e., the PoC terminal, receives the media for the audio, and the PoC client A2 1120 receives the media for the video. However, each of the terminals 1110 and 1120 is not limited to supporting only one media type, but can support various media types. The process of FIG. 8 corresponds to the case where there are two originating PoC clients. However, it is apparent that the session split-off is made possible by the process of FIG. 8 of the present invention in the case of at least one PoC client.

Further, the PoC client A1 1110 and PoC client A2 1120 illustrated in the present invention are merely for emphasizing that each client can set the media it wants to receive based on the choice of the user, regardless of the media support possibility of each client, split the set media based on their attribute values, and receive the split media.

The technique represented in FIG. 8 does not require the procedure of pre-setting the PoC services, unlike the techniques of FIGS. 4 and 6, so that it is not necessary to define a new header field value or parameters in the SIP PUBLISH message.

Meanwhile, the present invention is not limited to the PoC system, but applies to all systems in which a call according to a call request is made using a network based on an Internet Protocol (IP) Multimedia Core Network (CN) Subsystem (IMS) whose standardization has been completed or is in progress in the $3^{rd}$ Generation Partnership Project (3GPP) or 3GPP2, and information on the half-duplex call and the presence of the user.

Further, the method for PoC session connection can be applied to a one-to-one PoC call as well as a group PoC call such as a conference call using the same concept.

Meanwhile, the method for splitting the PoC multimedia session according to each media can provide compatibility with the standard technology of the conventional PoC system (PoC Release 1), for example, applying a one floor control mechanism.

According to current OMA PoC Release 1 standard technology, the media stream supporting only voice is defined, and the floor, the media format support of the terminal, etc. are included as considerations of the single media stream.

The future OMA PoC Release 2 standard technology plans to support other media formats such as video, text, etc., including voice, and is compatible with the multimedia communication system using the conventional Internet network.

According to the present invention, under this more expanded multimedia communication environment, the media-specific PoC compatible terminal split-off according to media format, and the method for supporting the same are expected to become vital to various applications of the PoC system.

As set forth above, the present invention can cause a ripple effect in the following technical and service aspects.

First, when a terminating PoC terminal does not support a media format provided at an originating PoC terminal or a PoC server with respect to a part of media (e.g. video) in the ongoing PoC Release 2 of the OMA standard, a session can be established by routing a session request using the PoC compatible terminal of a wired network which supports the corresponding media format.

Also, to this end, SIP expansion technology is provided, which sets terminals connected according to each media attribute that is not supported in PoC Release 1.

Moreover, the SIP expansion technology provides a method in which no modification exists as compared to an existing call in the originating PoC terminal's position, so that no compatibility problem occurs.

The above technology enables users to transmit specific media to a high-powered terminal such as a personal computer in a meeting such as a PoC video conference, and to make use of various application services such as storage, conversion and edition.

Further, the above-mentioned method enables the provision of services such as sharing and monitoring, using another PoC client with respect to a part of media exchanged in a multimedia call.

Although exemplary embodiments of the present invention have been described with reference to the attached drawings, the present invention is not limited to these embodiments, and it should be appreciated by those skilled in the art that a variety of modifications and changes can be made without departing from the spirit and scope of the present invention.

What is claimed is:

1. A method, by a server, for separating a session according to an attribute of media to transmit the media, the server connecting to at least one terminal through a Session Initiation Protocol/Internet Protocol (SIP/IP) core network, the method comprising the steps of:
    receiving a session establishment parameter for pre-setting an attribute of media on a multimedia session from arbitrary terminals;
    setting the session establishment parameter for each of the arbitrary terminals;
    receiving a multimedia session INVITE message from at least one requesting terminal, the multimedia session INVITE message including at least one attribute of media;
    extracting the attribute of media in the multimedia session INVITE message for splitting the arbitrary terminals according to the extracted attribute of media;
    comparing the extracted attribute of media with the set attribute of media for the arbitrary terminals;
    applying service settings to the arbitrary terminals corresponding to the INVITE message to establish a session with each of the arbitrary terminals based on the respective set attribute of media corresponding to each of the arbitrary terminals as a result of the comparison;
    splitting the multimedia session INVITE message to be transmitted to the arbitrary terminals based on the respective set attribute of media corresponding to each of the arbitrary terminals; and
    establishing a session with each of the arbitrary terminals by transmitting the split INVITE messages to corresponding routing addresses according to each of the arbitrary terminals.

2. The method according to claim 1, further comprising;
    receiving the media from the requesting terminal;
    splitting the received media according to each established session based on the respective set attribute of media corresponding to each of the arbitrary terminals; and
    transmitting respective split media to the arbitrary terminals according to the respective set attribute of media corresponding to each of the arbitrary terminals.

3. The method according to claim 1, further comprising;
    receiving, from the requesting terminal, a request message that includes a session establishment parameter for pre-setting an attribute of media on a multimedia session for a plurality of terminals;
    confirming a receipt of the request message and setting the service settings so as to split the plurality of terminals according to the respective attribute of media corresponding to each of the plurality of terminals to establish each session; and
    sending a response to the requesting terminal,
    wherein confirming reception of the request message comprises confirming a version, service information, information on authentication/authorization, and media types.

4. The method according to claim 1, wherein the server has a forking function for splitting and inviting the arbitrary terminals according to respective set attribute of media corresponding to each of the arbitrary terminals.

5. The method according to claim 3, wherein the information used for splitting the terminals according to the respective set attribute of media corresponding to each of the arbitrary terminals is included in a Session Initiation Protocol (SIP) PUBLISH message which has a format including an Event header for splitting the media according to each respective set attribute of media corresponding to each of the arbitrary terminals,
    wherein the Event header comprises a type of the terminal to be invited to the session according to the respective set attribute of media corresponding to each of the arbitrary terminals, respective address information corresponding to each of the arbitrary terminals, and respective information on media support capabilities corresponding to each of the arbitrary terminals.

6. The method according to claim 5, further comprising;
    receiving the SIP PUBLISH message for terminal split-off information;
    receiving a SUBSCRIBE message for checking information set in the server or detecting whether an event occurs from the requesting terminal requesting to establish the session; and
    transmitting a NOTIFY message including information on an event update of the SUBSCRIBE message to the requesting terminal requesting to establish the session.

7. A method, by server, for separating a session according to an attribute of media to transmit the media, the server connecting to terminals through a Session Initiation Protocol/Internet Protocol (SIP/IP) core network, the method comprising the steps of
    establishing a session with a requesting terminal for transmitting media
    receiving, from the requesting terminal, a request message after establishing the session, wherein the request message includes information for transmitting a respective part of the media to be forwarded to the requesting terminal to arbitrary terminals according to at least one respective media attribute corresponding to each of the arbitrary terminals;

transmitting a respective INVITE message to each of the arbitrary terminals to receive the respective part of the media that is newly split and transmitted;

establishing a session with each of the arbitrary terminals;

notifying the requesting terminal of a result of the request message;

granting floors of the requesting terminal and the arbitrary terminals;

splitting the media to be forwarded to the requesting terminal based on the at least one respective media attribute corresponding to each of the arbitrary terminals; and transmitting the split media to corresponding terminals of the arbitrary terminals according to the at least one respective media attribute corresponding to each of the arbitrary terminals.

8. The method according to claim 7, wherein the request message is included in a Session Initiation Protocol (SIP) REFER message, and wherein the SIP REFER message comprises dialogue information of the previously established session.

9. A method, by terminal, for separating a session according to an attribute of media to transmit the media, the terminal connecting to a session management server through a Session Initiation Protocol/Internet Protocol (SIP/IP) core network, the method comprising the steps of generating a request message that includes a session establishment parameter for pre-setting an attribute of media on a multimedia session for each of arbitrary terminals to the session management server so as to split the arbitrary terminals and a multimedia session INVITE message according to at least one respective attribute of media corresponding to each of the arbitrary terminals to establish a respective session with each of the arbitrary terminals;

transmitting the request message to the session management server;

transmitting the multimedia session INVITE message including the at least one attribute of media to the session management server; and transmitting the media to the session management server, wherein the request message is configured for, upon receipt by the session management server, extraction of the attribute of media from a certain multimedia session INVITE message for splitting the arbitrary terminals according to the extracted attribute of media and comparison of the extracted attribute of media with the set attribute of media for the arbitrary terminals in order to establish a session with each of the arbitrary terminals.

10. The method according to claim 9, further comprising;

before transmitting the media to the session management server, receiving a response to the request message from the session management server.

11. The method according to claim 9, further comprising;

receiving, by the arbitrary terminals from the session management server, at least one split INVITE message transmitted through corresponding routing addresses of each of the arbitrary terminals according to the at least one respective media attribute corresponding to each of the arbitrary terminals; and sending, by the each of the arbitrary terminals, a response to the at least one split INVITE message; and receiving, by the arbitrary terminals, split media according to the at least one respective attribute of media corresponding to each of the arbitrary terminals.

12. The method according to claim 9, wherein the information used for splitting the arbitrary terminals according to the at least one respective set attribute of media corresponding to each of the arbitrary terminals is included in a Session Initiation Protocol (SIP) PUBLISH message which has a format including an Event header for splitting the media according to each respective at least one set attribute of media corresponding to each of the arbitrary terminals, wherein the Event header comprises a type of terminal to be invited to the session according to each of at least one set attribute of media, respective address information of the arbitrary terminals, and respective information on media support capabilities of the arbitrary terminals.

13. The method according to claim 12, further comprising;

sending the SIP PUBLISH message to the session management server;

sending, to the session management server, a SUBSCRIBE message for checking the information set in the server or detecting whether an event occurs; and receiving, from the session management server, a NOTIFY message including information on an event update of the SUBSCRIBE message.

14. An apparatus for separating a session according to an attribute of media to transmit the media, the apparatus connecting to arbitrary terminals through a Session Initiation Protocol/Internet Protocol (SIP/IP) core network, the apparatus comprising:

a session management server for receiving a session establishment parameter for pre-setting an attribute of media on a multimedia session from arbitrary terminals;

setting the session establishment parameter for each of the arbitrary terminals;

receiving a multimedia session INVITE message from at least one requesting terminal, the multimedia session INVITE message including at least respective one attribute of media;

extracting the attribute of media in the multimedia session INVITE message for splitting the arbitrary terminals according to the extracted attribute of media;

comparing the extracted attribute of media with the set attribute of media for the arbitrary terminals;

applying service settings to the arbitrary terminals corresponding to the INVITE message to establish a session with each of the arbitrary terminals based on the respective set attribute of media corresponding to each of the arbitrary terminals;

splitting the received multimedia session INVITE message into split INVITE messages according to the at least one respective set attribute of media corresponding to each of the arbitrary terminals;

establishing a session with each of the arbitrary terminals by transmitting, to the arbitrary terminals, the split INVITE messages via corresponding routing addresses of the arbitrary terminals;

receiving the media from a requesting terminal;

splitting the received media according to the established sessions based on at the least one respective set attribute of media corresponding to each of the arbitrary terminals; and transmitting the split media to corresponding terminals of the arbitrary terminals.

15. The apparatus according to claim 14, wherein the session management server receives a request message including the session establishment parameter, confirms receipt of the request message, and sends a response to the requesting terminal in return.

16. The apparatus according to claim 14, wherein the session management server receives an SIP PUBLISH message for terminal split-off information, receives a SUBSCRIBE message for checking information set in the session management server or detecting whether an event occurs from the requesting terminal requesting to establish the sessions, and transmits a NOTIFY message including information on an event update of the SUBSCRIBE message to the requesting terminal requesting to establish the sessions.

17. The apparatus according to claim 14, wherein the session management server receives responses to the split INVITE messages from all the arbitrary terminals, and transmits, to the requesting terminal, the received responses to the split INVITE messages.

18. An apparatus for separating a session according to an attribute of media to transmit the media, the apparatus connecting to arbitrary terminals through a Session Initiation Protocol/Internet Protocol (SIP/IP) core network, the apparatus comprising:

a session management server for establishing a session with a requesting terminal for transmitting media;

receiving, from the requesting terminal, a request message after establishing the session, wherein the request message includes information for transmitting a part of the media to be forwarded to the requesting terminal to the arbitrary terminals according to at least one respective media attribute corresponding to each of the arbitrary terminals;

transmitting at least one split INVITE message based on at least one respective media attribute corresponding to each one of the arbitrary terminals to the each one of the arbitrary terminals to receive a respective part of the transmitted media;

establishing a session with each of the arbitrary terminals;

notifying the requesting terminal of a result of the request message;

granting floors of the requesting terminal and of the arbitrary terminals;

splitting the media to be forwarded to the requesting terminal based on at least one respective media attribute corresponding to each of the arbitrary terminals; and transmitting the split media to corresponding terminals of the arbitrary terminals.

19. An apparatus for separating a session according to an attribute of media to transmit the media, the apparatus connecting to a session management server through a Session Initiation Protocol/Internet Protocol (SIP/IP) core network, the apparatus comprising:

a terminal for generating a request message that includes a session management parameter for pre-setting an attribute of media on a multimedia session for each of arbitrary terminals to the session management server so as to split the arbitrary terminals and a multimedia session INVITE message according to at least one respective attribute of media corresponding to each of the arbitrary terminals to establish a session with each of the arbitrary terminals;

transmitting the request message to the session management server;

transmitting the multimedia session INVITE message including the at least one attribute of media to the session management server; and transmitting the media to the session management server, wherein the request message is configured for, upon receipt by the session management server, extraction of the attribute of media from a certain multimedia session INVITE message for splitting the arbitrary terminals according to the extracted attribute of media and comparison of the extracted attribute of media with the set attribute of media for the arbitrary terminals in order to establish a session with each of the arbitrary terminals.

20. The apparatus according to claim 19, wherein the terminal receives, before transmitting the media to the session management server, a response to the request message from the session management server.

21. The apparatus according to claim 19, wherein each of the arbitrary terminals receives a split INVITE message through a corresponding routing address of each of the arbitrary terminals according to the at least one respective attribute of media corresponding to each of the arbitrary terminals from the session management server, sends a response to the split INVITE message, and receives split media according to the respective at least one set attribute of media corresponding to each of the arbitrary terminals.

22. The apparatus according to claim 19, wherein the terminal sends an SIP PUBLISH message for terminal split-off information to the session management server, sends, to the session management server, a SUBSCRIBE message for checking information set in the session management server or detecting whether an event occurs, and receives, from the session management server, a NOTIFY message including information on an event update of the SUBSCRIBE message.

* * * * *